July 21, 1964 — W. D. NOVAK — 3,142,009
ANGLE CONTROL MECHANISM
Filed Aug. 8, 1962 — 2 Sheets-Sheet 1
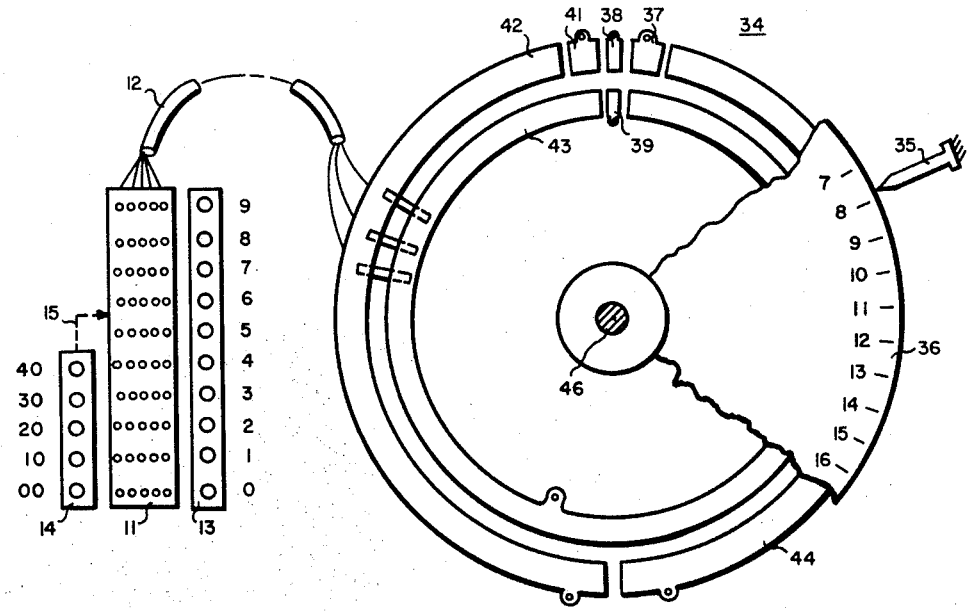
FIG. 1
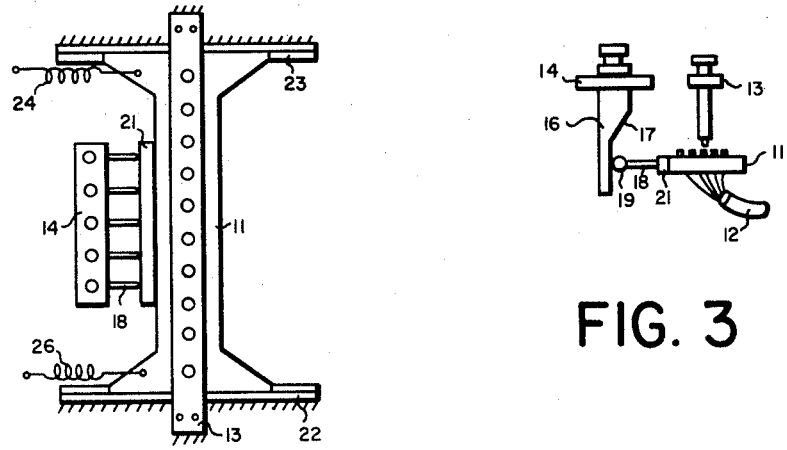
FIG. 2
FIG. 3
*INVENTOR.*
WARREN D. NOVAK
BY
ATTORNEY July 21, 1964 W. D. NOVAK 3,142,009
ANGLE CONTROL MECHANISM
Filed Aug. 8, 1962 2 Sheets-Sheet 2

INVENTOR.
WARREN D. NOVAK
BY *H. S. Mackey*
ATTORNEY

United States Patent Office 3,142,009
Patented July 21, 1964

3,142,009
ANGLE CONTROL MECHANISM
Warren D. Novak, Chappaqua, N.Y., assignor to General Precision, Inc., a corporation of Delaware
Filed Aug. 8, 1962, Ser. No. 215,624
5 Claims. (Cl. 318—28)

This invention relates to angle positioning and control mechanisms.

Occasions arise when it is desired to position a drum, disc or other rotating mechanical part to an exact angle by remote control and by merely depressing a button. The present electromechanical device accomplishes this object simply and efficiently.

Briefly described, the rotating portion of the mechanism, which is to be positioned, is secured to a member carrying a plurality of commutating rings and several conventional slip rings. A number of actuators are positioned around the commutating rings so that, when one of the actuators is energized, a brush is made to interconnect two of the rings. This causes a motor to be energized which rotates the structure until it comes to a selected position relative to the particular actuator which was energized.

The actuators are identical and are arranged around the periphery of the commutator member, there being an actuator provided corresponding to each angular position to which it may be required to position the rotating part. Each actuator is provided with a Bowden wire connecting it to a pushbutton panel assembly so arranged, that by pushing one or more pushbuttons, one particular actuator is energized.

The object of this invention is to provide a mechanism and electrical circuit for positioning a rotating part by remote control to a selected angle.

The invention may be more clearly understood from the following description and by reference to the accompanying drawings, in which:

FIGURE 1 is a view of the pushbutton panel assembly face together with a plan view of the commutating rings, constituting a view of FIGURE 4 sectioned on the line 1—1.

FIGURE 2 is a view of the pushbutton plates and push rod plate assembly.

FIGURE 3 is an end view of the pushbutton plates and push rod plate showing the mode of operation of the tens pushbutton plate.

Figure 4:
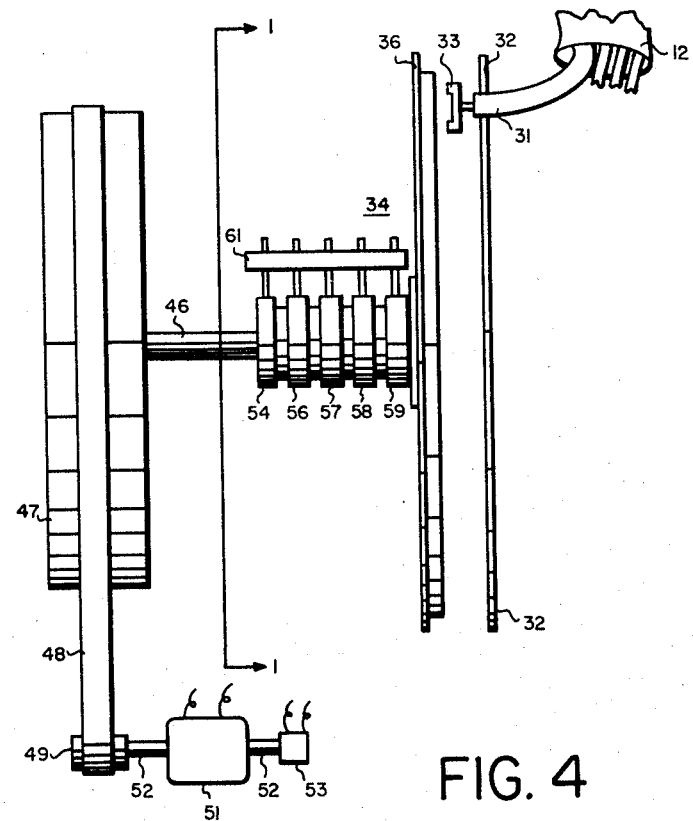
FIGURE 4 is a side view of the rotating members, together with an edge view of the associated stationary Bowden wire terminals and actuators.

Referring now to FIGURE 1, a plate 11 is provided with fifty push rods arranged in ten rows and five columns. Each locks itself down when pressed, and interlocks are provided so that the depression of any push rod releases any other which may have been depressed and locked down. These locks and interlocks are conventional and are not shown in detail. Each push rod is connected to one end of a steel wire running into and through a small diameter flexible steel tube, such as hypodermic tubing, anchored at both ends. This device for transmitting mechanical displacement to a distance is sometimes referred to as a Bowden wire. The fifty Bowden wires are collected into a bundle 12. A plate 13 containing 10 pushbuttons, numbered 0 to 9, is positioned over the plate 11 and the two plates 11 and 13 may have relative motion so that the ten pushbuttons can be positioned in registration over any one of the five columns of ten push rods. Another pushbutton plate 14 contains five pushbuttons designated 00, 10, 20, 30 and 40. These five buttons are connected by mechanical elements 15 to the plate 11 so that, when one of the five pushbuttons is depressed, the plate 11 is moved to position a selected one of its five columns of push rods under the column of pushbuttons of plate 13.

The mechanical elements connecting the pushbuttons 14 to the plate 11 are shown in FIGURES 2 and 3. Each of the five buttons in plate 14 is provided with a flat shaft 16 containing an oblique cam portion 17. A follower rod 18 is provided with a roller 19 which is pressed against the edge of the shaft 16. The other end of the rod 18 is positioned to engage the flat surface of a block 21 secured to the edge of the push rod plate 11. This plate 11 is arranged to slide in two grooved rods, 22 and 23, and is provided with two tension springs, 24 and 26, which urge it toward the plate 14.

In operation, the oblique cam surfaces 17 of the five pushbutton shafts 16 have five different amounts of rise, so that, by pushing one of the buttons 14, any one of the five columns of push rods can be positioned under the column of ten pushbuttons 13.

The fifty Bowden wires 12 are connected to fifty terminals, represented by the armor terminal 31 in FIGURE 4. All fifty terminals are anchored to a stationary disc-like frame 32. Each Bowden wire is terminated in an actuator consisting of a U-shaped conductive brush 33, so that movement of the push rod moves the brush 33 away from or toward the anchorage 31.

The fifty terminals and the brushes are evenly spaced in a circle so that the brushes are adjacent to two flat copper concentric rings, and are so arranged that when a brush is pushed away from its anchorage, the brush makes contact with both rings and connects them together electrically. When the brush is retracted, it is removed from the rings and no longer connects them.

The two concentric rings are part of a rotating structure 34, FIGURES 1 and 4, and are secured to the face of an insulating disc 36. The disc 36 is inscribed with suitable indicia on its edge and a stationary index pointer 35 is positioned adjacent thereto. The two concentric rings are interrupted by gaps so that they constitute commutators. The inner ring is broken by two insulating gaps to form two sections or sectors, 39 and 43. The outer ring is broken by insulating gaps to form five sectors insulated from each other and ground: 37, 38, 41, 42 and 44. Alternatively this ring can be reduced to three sectors by omitting sectors 37 and 41, as will be described.

The two rings are positioned in a plane and are concentric about a central drive shaft 46. This shaft is connected to a drum or cylinder 47 which represents any utilization mechanism which is to be angularly positioned. This drum 47 is driven through a belt 48 and pulley 49 by a motor 51. This motor may be conventional but is preferably geared down by self-contained gears between the armature shaft and the output shaft. The motor output shaft 52 is provided with an electromechanical brake 53. Five slip rings 54, 56, 57, 58 and 59 are mounted on the shaft 46 and are driven by it. A brush holder 61 holds five brushes in contact with the five slip rings respectively.

Figure 5:
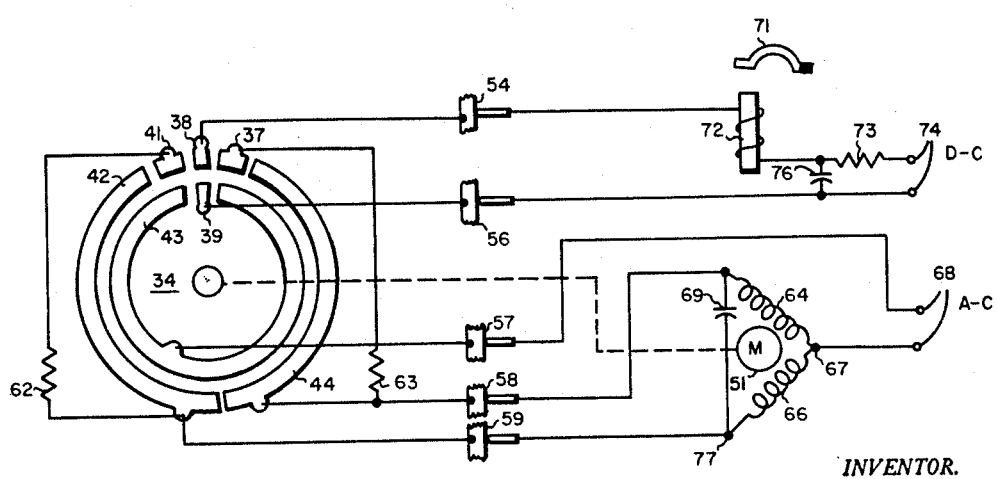
FIGURE 5 is a schematic diagram of the angle control device.

The five slip rings are connected to the seven sectors of the commutator rings as shown in the schematic diagram of FIGURE 5. Sector 41 is connected to sector 42 through a resistor 62 and sector 37 is connected to sector 44 through a resistor 63. The two sectors 42 and 44 are connected to the ends of the two windings 64 and 66 of the capacitor motor 51 through slip rings 59 and 58. The common junction 67 is connected to one of the alternating current power terminals 68, the other terminal being connected through slip ring 57 to the sector 43. The ends of windings 64 and 66 are interconnected by a capacitor 69. The motor is provided with a brake represented by the yoke 71 associated with a brake-actuating solenoid 72. This solenoid is connected through slip ring 54 to sector 38 and through a resistor 73 to one of a pair of direct-current power terminals 74. The other direct-current terminal 74 is connected to sector 39 through slip ring 56. A capacitor 76 is connected through the resistor 73 to the direct-current terminals 74.

In the operation of the angle control mechanism suppose that the position 23 is to be attained by the utilization device 47 as indexed on the edge of the disc 36. The "20" button and the "3" button are pressed. The "20" button positions the plate 11 so that the middle column of push rods of plate 11 becomes positioned under the ten pushbuttons of plate 13. Depression of pushbutton "3" then depresses and locks the corresponding push rod and brings the corresponding brush into contact, in general, with sector 43 and with either sector 42 or 44 depending on whether the brush happens to be on the left or right half of the rotating member 34. If the brush is on sector 42, the bridging of sectors 42 and 43 causes current to flow from an alternating current terminal through slip ring and brush 57, sectors 43 and 42, slip ring 59, to terminal 77 and coil 66 back to the other power terminal. Quarter phase current is also made to flow from terminal 77 through capacitor 69 and coil 64, which causes the motor 51 to rotate and drive the rotating member 34 in such direction as to bring the operating brush by the shorter path to the sectors 43 and 41. The resistor 62 is thereby inserted in the current path, causing the motor speed to decrease. Further motion moves the brush to the sectors 38 and 39, terminating the motor 51 excitation and closing the motor brake circuit. The function of the capacitor 76 is to cause a large initial current surge through the solenoid 72, after which a small current flows through the resistor 73 and the solenoid, holding the brake on. At the next operation, when another set of buttons is pressed, the brush connecting sectors 38 and 39 is raised, opening the brake solenoid circuit. The capacitor 76 then recharges slowly from the direct-current power source through the resistor 73. The use of the capacitor thus permits the use of a low-power source while providing powerful initial braking action.

If the brush actuated by depressing pushbuttons "20" and "3" should happen to be on the right half of the rotating member 34, exactly the same operations occur except that sector 44 is substituted for sector 42, and sector 37 is substituted for sector 41 and the motor is rotated in the opposite direction.

When the motor brake is provided with sufficient braking force and the inertia of all parts is made sufficiently low, it is possible to dispense with the use of the low-speed sectors 37 and 41, and the associated resistors 62 and 63, and stop the motor quickly by switching from the full power condition to the braked condition.

What is claimed is:
1. A mechanism for angularly positioning a rotatable member comprising,
   a pair of circular concentric commutators secured to said rotatable member,
   a plurality of brushes concentrically disposed about said pair of commutators, each brush having a normal position separated from the commutators and an operated position bridging the pair of commutators,
   actuating means for selecting and operating any selected one of said brushes,
   an electric motor for rotating said rotatable member,
   an electric power source for said motor,
   and means connecting said commutators to said motor and to said electric power source whereby the rotatable member is positioned in accordance with the selection of the operated brush.

2. A mechanism for angularly positioning a rotatable member in any one of a plurality of selected angular positions comprising,
   first and second commutator rings secured to said rotatable member and concentrically positioned about the axis thereof, said first commutator ring including a short braking sector encompassing an angular arc less than the distance between selected angular positions and a long sector encompassing substantially the remainder of the circumference of said first commutator ring, and said second commutator ring including at least a short braking sector equal in length to said first-mentioned braking sector and positioned in juxtaposed relation with respect thereto and a pair of long sectors of equal length encompassing substantially the remainder of the circumference of said second commutator ring,
   a reversible electric motor including energizing windings the opposite ends of which are connected to said pair of long sectors of said second commutator,
   an energizing source for said motor having one terminal thereof connected to the long sector of said first commutator ring and the other terminal thereof connected to the energizing windings of said motor,
   an electrically operated brake for said motor connected through an energizing source to the short braking sectors of said first and second commutator rings,
   a plurality of brushes disposed in angularly-spaced relation about the circumferential position occupied by said commutator rings and so arranged that in actuated position a bridging connection is made between the sectors of said first and second commutator rings,
   and means for selectively moving said brushes to actuated position.

3. A mechanism as set forth in claim 2 in which said means for selectively moving said brushes comprises,
   Bowden wire actuators connected to each of said brushes,
   and pushbutton means for selectively operating only a single Bowden wire actuator at any one time.

4. A mechanism as set forth in claim 2 including,
   a pair of short commutator sectors positioned on each side of said short braking sector of said second commutator ring between said braking sector and the ends of said pair of long sectors, said short commutator sectors being connected to the opposite ends of the energizing windings of said motor through a resistance.

5. A mechanism as set forth in claim 4 in which said means for selectively moving said brushes comprises,
   Bowden wire actuators connected to each of said brushes,
   and pushbutton means for selectively operating only a single Bowden wire actuator at any one time.

References Cited in the file of this patent
UNITED STATES PATENTS

| | | |
|---|---|---|
| 2,853,967 | Schwab | Sept. 30, 1958 |
| 3,039,037 | Daniels et al. | June 12, 1962 |